Figure 1:
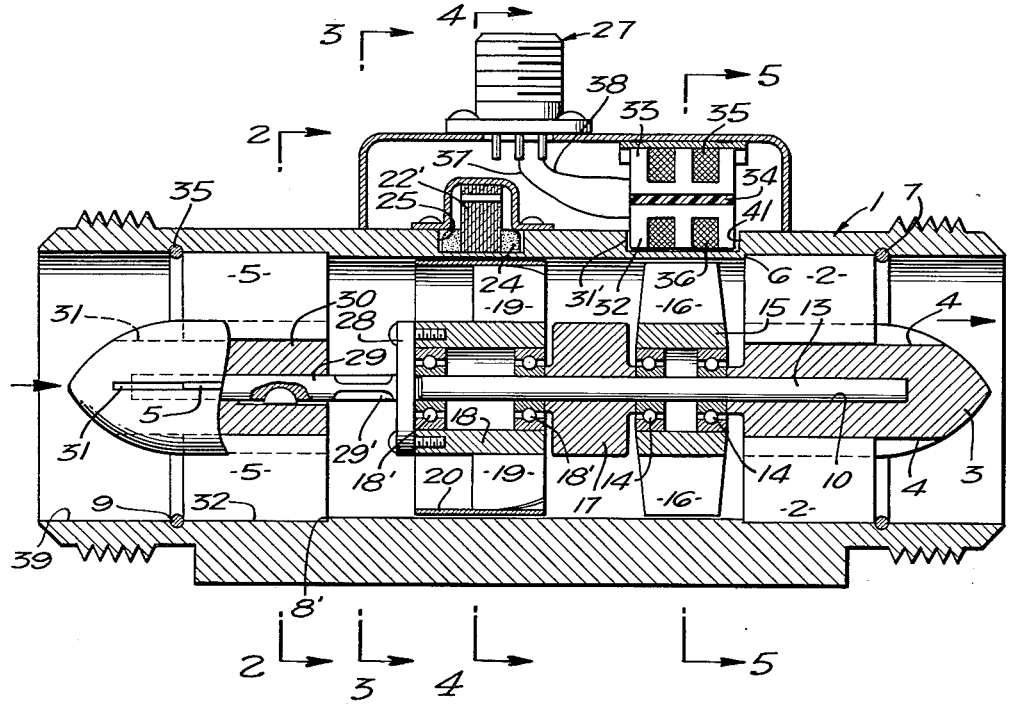

July 10, 1962  C. C. WAUGH ETAL  3,043,139

MASS FLOW METER

Filed July 28, 1958  2 Sheets-Sheet 1

CHARLES C. WAUGH
KENNETH R. JACKSON
INVENTORS

BY Philip Subkow

ATTORNEY

CHARLES C. WAUGH
KENNETH R. JACKSON
INVENTORS

United States Patent Office 3,043,139
Patented July 10, 1962

3,043,139
MASS FLOW METER
Charles C. Waugh, Tarzana, and Kenneth R. Jackson, Los Angeles, Calif., assignors, by mesne assignments, to The Foxboro Company, a corporation of Massachusetts
Filed July 28, 1958, Ser. No. 751,281
7 Claims. (Cl. 73—194)

This invention relates to a mass flow meter which reports the mass rate of flow of fluids, either liquid or gas, or a combination.

In our copending applications Serial No. 751,558, filed July 28, 1958, and now abandoned; Serial No. 751,282, filed July 28, 1958, and Serial No. 751,511, filed July 28, 1958, we have described mass flow meters in which a fluid traveling in a conduit is given an angular velocity.

In the flow meter of our invention a part of the kinetic energy of linear or axial flow is converted into rotational kinetic energy of the fluid by means of a rotatable means which is angularly displaced by the fluid whereby an angular velocity is imparted to the fluid by exerting a drag torque on said rotatable means over the range of variation of flow rates of interest, the resultant ratio of torque to fluid angular velocity being a measure of the mass flow rate of the fluid.

This result is accomplished by employing an impeller which converts a portion of the axial flow energy into rotational flow enery. Means are also provided to measure the drag torque on the rotatable means.

The specific means employed to impart rotational energy to the fluid is a freely rotating but spring restrained impeller whose blades are so designed that the impeller is turned by the axial flow of the fluid entering the wheel. The turbine blades may be of helical configuration. The fluid exiting from the impeller is given an angular rotation at a rate which is a function of the linear volume flow rate of the fluid entering the turbine wheel. If "$w_f$" is the angular velocity of the fluid, and "$t$" is the torque exerted by the fluid "$r$" is the density of the fluid, "$V$" is the lineal axial fluid volume velocity and "$m$" is the mass rate of flow, then the torque "$t$" is proportional to the product "$rVw_f$," since "$m$" is equal to $rV$, the mass rate of flow is proportional to the fraction $t/w_f$. A sensing element is provided in the downstream side of the impeller to sense the angular velocity of the fluid $w_f$.

In our preferred embodiment we employ a helical blade impeller having a plurality of circumferentially spaced helical blades whereby when the fluid passes between the blades a portion of its kinetic energy is translated into rotational energy. The rotating fluid exerts a torque against the helical blades. In our preferred embodiment we sense the magnitude of this torque and measure a value proportional to this torque.

Since this measured torque is proportional to $rw_fV$, and mass flow rate is equal to $rV$, the mass flow rate is proportional to the torque divided by the fluid angular velocity.

In our preferred embodiments, we sense the angular velocity of the fluid by means of a rotor which is turned by the fluid leaving the helical blades. The rotor is preferably composed of a plurality of circumferentially spaced radial blades to which a turning torque is applied by the fluid flowing from the helical blades as a result of its angular velocity. The radial blade rotor is thus caused to rotate at a rate corresponding to the angular velocity of the fluid exiting from the turbine wheel.

In our preferred embodiment we sense the rate of rotation of the radial blade rotor by means of an inductive pick-off in which the flux density of a magnetic circuit which is inductively coupled with a field coil, varies as the blades of the rotor pass by the core of the pick-off. This results in a periodic flux density change at a rate equal to the rate at which the blades pass the pick-off, and, therefore, a voltage is generated at the terminals of the coil which is proportional to the rate of rotation of the rotor blades.

The information circuits for this transducer include means cooperating with the inductive pick-off to generate a voltage pulse at a rate corresponding to the rate of rotation of the rotor and means to sense the magnitude of the torque on the helical blade rotor.

Figures 2, 3:
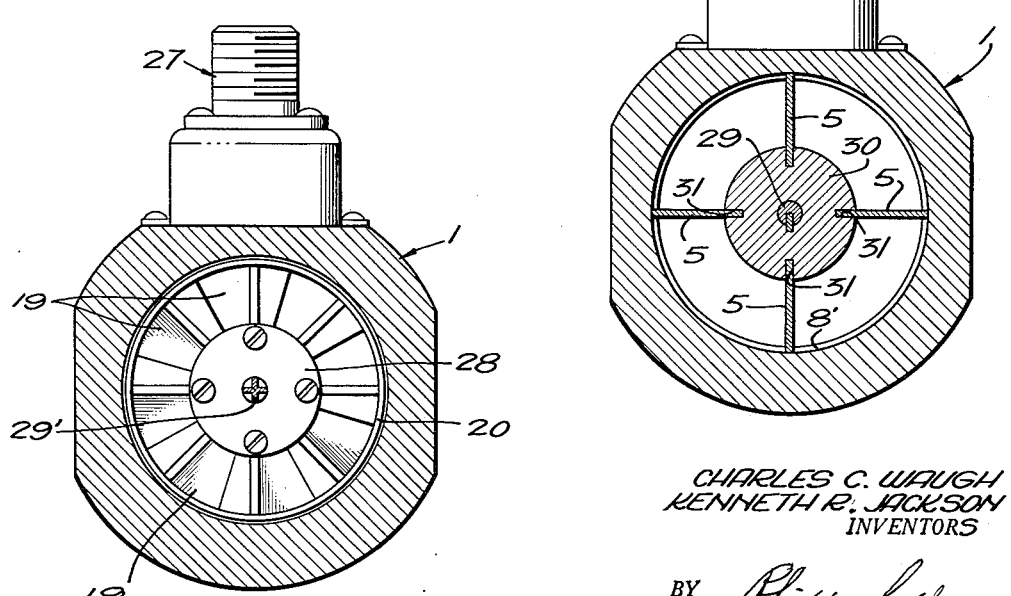
Figures 4, 5:
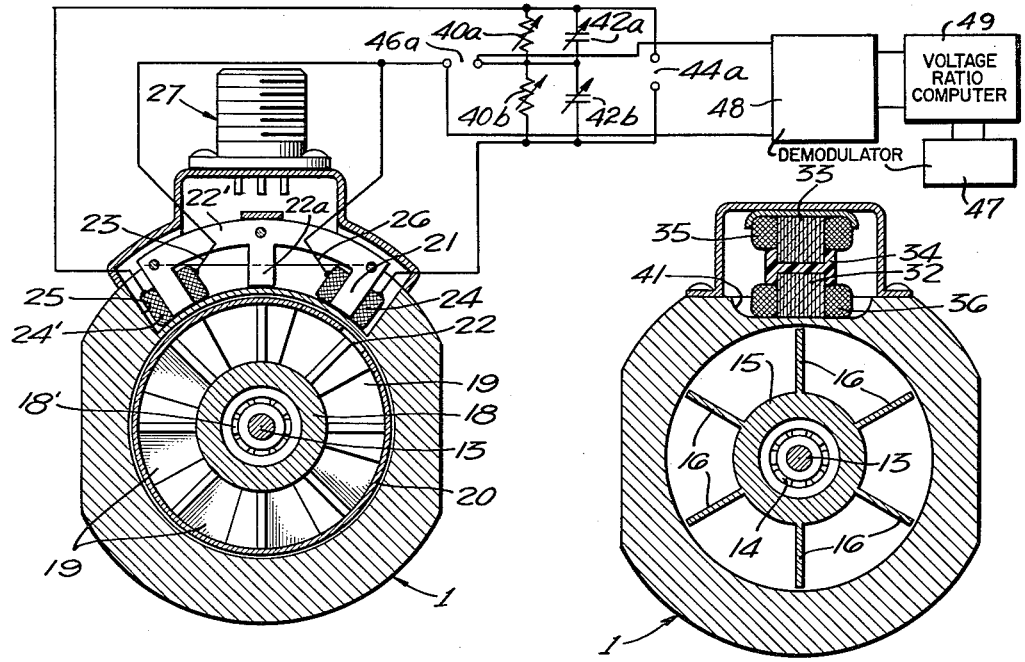
Figure 6:
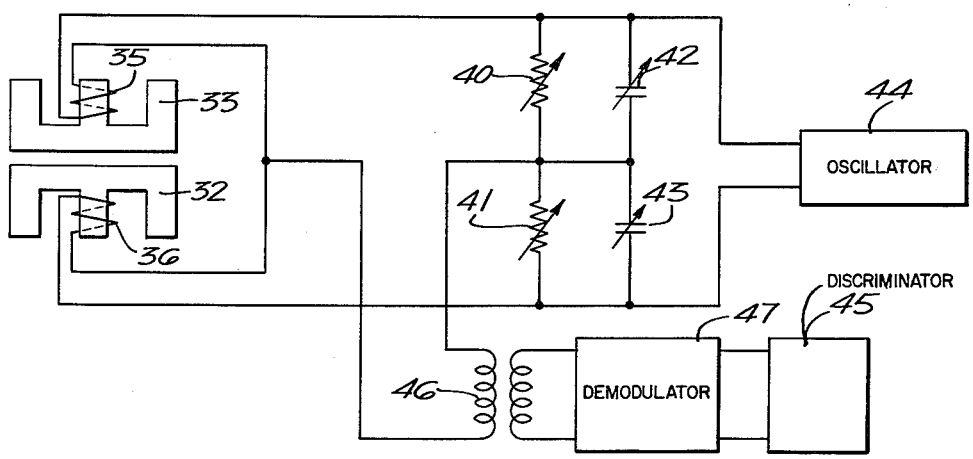

These and other objects of our invention will be further described in connection with the drawings of which
FIG. 1 is a vertical section through the mass flow meter of our invention;
FIG. 2 is a section on line 2—2 of FIG. 1;
FIG. 3 is a section on line 3—3 of FIG. 1;
FIG. 4 is a section on line 4—4 of FIG. 1;
FIG. 5 is a section on line 5—5 of FIG. 1 and
FIG. 6 is a schematic diagram of one information circuit used on our invention.

The transducer for a mass flow meter shown in FIG. 1 consists of a tubular case 1 suitably provided with screw threads or other suitable means for connecting the case with conduits. The case 1 thus provides a flow channel with an input port at one end and an output port at the other end. The flat radial blades 2 are mounted in the hub 3 which is streamlined towards the downstream side of the flow meter, the fluid entering as shown by the arrow at the left of FIG. 1. The radial blades 2 are positioned in slot 4 in the hub 3. At the other end of the flow meter are positioned like flat radial blades 5 which will be further described. The blades 2 abut an internal shoulder 6 and are held in position by a snap ring 7. The flat blades 5 in cruciform arrangement are held in position against an internal shoulder 8' by means of snap ring 9. The blades 2 and 5 are stationary. Mounted in bore 10 in the hub 3 is a stationary axle 13 on which is mounted the bearing 14 fixedly positioned on the shaft 13, on which the hub 15 carrying the flat blades 16 is rotatably mounted. The flat blades 16 are radially positioned at equally spaced intervals circumferentially of the hub 15. For purposes of description we will refer to this assembly as the radial blade rotor. It will be understood that other forms of blades may be used to be rotated by the angularly moving fluid to function in a manner similar to the flat blades 15 and these are included in the term radial rotor. Adjacent the bearing 14 is a separator 17 fixedly mounted on the shaft 13. Adjacent the separator 17 is a hub 18 mounted on bearing 18' on shaft 13 and carrying the helical blades 19 fixedly mounted on hub 18. The helical blades 19 are positioned at equally spaced intervals about the hub 18. While we prefer to use helical blades, any other geometric configuration which will cause the blades to give to the fluid passing therethrough a rotary motion described for the helical blades 19 may be employed. For purposes of distinguishing the helical blade assembly we will refer to the assembly of the blades 19 as the helical balde impeller, understanding this term to include equivalent forms of blades. We prefer, however, to employ a blade of helical form for the helical blade impeller and a flat blade for the radial blade rotor.

A shroud ring 20 is fixedly mounted on the outer edges of the helical blades to move therewith. The ring is formed with a hole 22 intermediate the circumferential edges of the ring. A notch 25 is positioned in the squared off top of the case 1 opposite the hole 22.

Positioned in the notch 25 is a differential inductive pick-off formed of the E-core 22' whose outer legs are wound with the coils 24 and 24' connected by leads 23 and 26 to the output 46a.

The plate 28 is fixedly connected to hub 18 for rotation therewith, and to a shaft 29. The shaft 29 fits in a bore in the hub 30 carrying slots 31 similar to the slots 4 in the hub 3. The shaft 29 is positioned rigidly in the hub 30 as by brazing.

A flexure 29' of cruciform section is milled in the shaft 29 which thus acts as a torsional flexure or spring, rigidly connected to said helical blade rotor and to the shaft mounting 30.

Positioned in the notch 41 adjacent to blade 16 are back-to-back E-shaped cores 32 and 33, separated by insulating separator 34. The center leg of each of the E-shaped cores is wound with a coil 35 and 36. The cores are connected by leads 37 and 38 to the connector 27.

The case may be made of aluminum or other non-magnetic materials such as non-magnetic stainless steel. This is also true of all other portions of the flow meter as indicated above except as follows:

The cores of the electromagnets 22', 32 and 33 are made of laminated iron such as is used in electromagnet cores or transformers and the blades 16 and shroud ring 20 are of metal having a high magnetic permeability. The hubs, bearings, shafts, straightening vanes, nosepieces, and other portions of the structure are made of non-magnetic material such as stainless steel. By the term non-magnetic, we wish to be understood that the material has a relatively low permeability so that it will not affect the action of the inductive pick-offs 22' and 32 and 33 on the blade 16.

The incoming fluid enters through inlet 39 and passes by blades 5 whereby angular velocity of the entering fluid is removed. In passing by the blades 19, due to their helical conformation, a rotation is imparted to the fluid and a reactive torque on the blades 19. This rotation is opposed by the torsional flexure and thus the rotor rotates through a small angle which may be but a few degrees until it takes an angular position wherein the torque imposed by the fluid is balanced by the torsional stress in the flexure. The angle of deflection is thus proportional to the torque. The fluid exiting from the blades 19 will therefore have an angular velocity dependent on the lead angle of the helical blades and the linear velocity of the entering fluid. As the rotating fluid passes through the blades 19, the blades 19 will impart a substantial angular velocity to the fluid entering the blades 16 and a substantially equal rate of rotation of the radial blade rotor 15. Downstream bullet-shaped member 3 will prevent any violent changes in the fluid flow pattern immediately leaving the second rotor blade 16. The vanes 2 on the downstream side are used to position the nosepiece 3 and will also be of assistance in the action of 3.

The hubs 18, 15 and spacer 17 are made of the same exterior diameter to limit the amount of turbulence in the chamber 1 passing by the elements of the transducer.

The pulse generator illustrated in FIG. 1 will produce a pulse at a rate which is proportional to the rate of rotation of the impeller. A suitable circuit is shown schematically in FIG. 6, in the form of an inductive pick-off. Two identical E-cores 32 and 33, made up of standard transformer iron laminations and mounted back-to-back as described above, have their coils 36 and 35 mounted on the center leg of each of the cores 32 and 33. The coils are connected in an electrical bridge circuit including the resistances 40 and 41 and the trim capacitors 42 and 43 (FIG. 6). The bridge is fed by an oscillator 44 and the output of the bridge is inductively coupled with the demodulator 47 and to a frequency-to-voltage converter in the form of a discriminator shown at 45.

When there is no flow through the unit, the bridge is balanced by adjusting the resistances 41 and 40 and the capacitors 42 and 43 until the output at 46 is zero, with the oscillator 44 driving the bridge at a fixed frequency. Whenever the bridge is unbalanced, as when a blade 16 passes by the core 32 and the reluctance of the magnetic circuit is decreased, an output voltage will appear at the output of 46. The carrier frequency of the oscillator 44 is modulated by the frequency generated by the rotation of the blades, which is dependent upon the rate of rotation of blade 16 past the core 32.

The output of the demodulator 47 gives voltage pulses at the rate corresponding to the rate of rotation of the blade 16 with negligible reflected torque due to the magnetic circuit coupling between the inductive pick-off and the rotor blade 16.

The output of the demodulator 47 is passed to a frequency-to-voltage converter 45 of the discriminator type whose output voltage is proportional to the input frequency and is thus a measure of the angular velocity.

With no flow through the meter, no deflection of the hub 18 occurs, and the edge of the hole 22 is at the edge of the pole piece 21. The like legs of E-core 22' wound with like inductive pick-off coils 24 and 24' are opposite the solid shroud, so that the electrical bridge is balanced (similar to FIG. 6). The coils are connected into an impedance bridge. The bridge is completed by the resistances 40a, 40b and the capacitors 42a and 42b. The input of the bridge is at 44a and the output at 46a. The unbalance of the bridge is a measure of the angle through which the blades 19 have been displaced (see FIG. 4).

With no flow through the meter, the impedance bridge is balanced since the impedance of the coil 25' equals that of 24 and no output is obtained. On deflection of the hub 18, for example, counterclockwise will cause the reluctance in the legs of the magnetic circuit, e.g., that including coil 24 to increase. The unbalance thus results in a decrease in the impedance of the coil 24. The impedance becomes unbalanced to a degree proportional to the angle through which the hub 18 is deflected. The voltage output of the bridge is thus proportional to the angle of deflection of hub 18 and thus to the torque exerted by the fluid on the helical blades, which is balanced by the torque due to stress in the flexure 31, caused by the torsional twist imposed in the flexure.

We thus obtain a value which is proportional to the torque ($t$) and a value which is proportional to the angular velocity ($w_f$). We may thus, by dividing these values obtain a value proportional to the mass flow rate. Thus, on calibration of the instrument by passing fluid of known mass velocity through the transducer, the transducer may be calibrated in terms of these parameters and in turn a measure of these parameters will give the mass flow rate.

The calculation may be made from observation or recordation of the resultant values or by an automatic computer for example by connecting a demodulator 48 to the output at 46a (see FIG. 4) and connecting the output of this demodulator and the demodulator 47 of FIG. 6, to a voltage ratio device 49 which will record the ratio of the D.C. voltage outputs of the demodulators. Such components are well known in the electrical art. See "Process Instruments and Controls Handbook," edited by Douglas M. Considine, published by McGraw-Hill Co. of N.Y. (1957), section entitled "Electronic Self Balancing Instruments," pages 8–109 through 8–117.

While we have described particular embodiments of our invention for the purpose of illustration, it should be understood that various modifications and adaptations thereof may be made within the spirit of the invention as set forth in the appended claims.

We claim:

1. A transducer for a fluid mass flow meter, comprising means defining a flow channel, said means including an entrance port and an exit port, rotatable means in said channel rotated by the flow of said fluid in response to the linear velocity of fluid entering said entrance port, means opposing the rotation of said rotatable means and confining said rotation to a small angular displacement, said rotatable means imposing an angular velocity to said fluid flowing past said rotatable means, and means for measuring the angular velocity of said fluid passing from said rotatable means.

2. A transducer as set forth in claim 1, and further including magnetic induction means for sensing the angular displacement of said rotatable means and converting the same into an electrical signal indicative of the torque imposed on said rotatable means by said rotation opposing means, means cooperating with said angular velocity measuring means for providing an electrical signal indicative of said angular velocity, and means for combining said two electrical signals for indicating the mass flow of fluid through said channel.

3. A transducer as set forth in claim 1, wherein said rotation opposing means includes a torsional flexure carried by said channel means and connected to said rotatable means.

4. A transducer as set forth in claim 1, wherein said rotatable means comprises a helical blade rotor, and said angular velocity measuring means comprises a radial blade rotor mounted in said channel for unrestrained rotation.

5. A transducer as set forth in claim 4, and further including means for sensing the rate of rotation of said radial blade rotor, and means for sensing the angular displacement of said helical blade rotor.

6. A transducer as set forth in claim 5, wherein both said sensing means are magnetic induction devices.

7. A transducer as set forth in claim 6, wherein said rotation opposing means includes a torsional flexure carried by said channel means and connected to said helical blade rotor.

References Cited in the file of this patent

UNITED STATES PATENTS

| | | |
|---|---|---|
| 720,188 | Seidener | Feb. 10, 1903 |
| 2,697,942 | Engelder | Dec. 28, 1954 |
| 2,709,755 | Potter | May 31, 1955 |
| 2,800,794 | Meneghelli | July 30, 1957 |
| 2,832,218 | White | Apr. 29, 1958 |
| 2,857,761 | Bodge | Oct. 28, 1958 |
| 2,882,727 | Newbold | Apr. 21, 1959 |

FOREIGN PATENTS

| | | |
|---|---|---|
| 744,852 | Great Britain | Feb. 15, 1956 |

OTHER REFERENCES

Text Book, "Principles of Aerodynamics" by Dwinnell, published 1949, by McGraw-Hill Co., pages 32–34.